US008150815B2

(12) United States Patent
Vian et al.

(10) Patent No.: US 8,150,815 B2
(45) Date of Patent: *Apr. 3, 2012

(54) SYSTEM, METHOD AND COMPUTER PROGRAM PRODUCT FOR REAL-TIME EVENT IDENTIFICATION AND COURSE OF ACTION INTERPRETATION

(75) Inventors: John L. Vian, Renton, WA (US); Gregory J. Clark, Seattle, WA (US); Paul E. R. Pigg, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/625,121

(22) Filed: Nov. 24, 2009

(65) Prior Publication Data

US 2010/0070445 A1 Mar. 18, 2010

Related U.S. Application Data

(63) Continuation of application No. 10/994,773, filed on Nov. 22, 2004, now Pat. No. 7,668,632.

(51) Int. Cl.
*G06F 17/30* (2006.01)
*G06F 7/00* (2006.01)

(52) U.S. Cl. ................. 707/693; 707/737; 707/999.001; 707/999.102; 707/999.201; 701/45; 701/19; 706/15; 706/54

(58) Field of Classification Search ........................ None
See application file for complete search history.

(56) References Cited

U.S. PATENT DOCUMENTS

| | | | | |
|---|---|---|---|---|
| 5,182,710 | A | 1/1993 | Tomisawa | |
| 6,114,976 | A | 9/2000 | Vian | |
| 6,317,658 | B1 | 11/2001 | Vian | |
| 6,343,236 | B1 * | 1/2002 | Gibson et al. | 700/79 |
| 6,810,372 | B1 * | 10/2004 | Unnikrishnan et al. | 703/13 |
| 2002/0120736 | A1 * | 8/2002 | Martin et al. | 709/224 |
| 2002/0183866 | A1 * | 12/2002 | Dean et al. | 700/26 |
| 2003/0137194 | A1 * | 7/2003 | White et al. | 307/10.1 |
| 2004/0112124 | A1 * | 6/2004 | Sonnenrein et al. | 73/118.1 |
| 2005/0234616 | A1 * | 10/2005 | Oliver et al. | 701/33 |

OTHER PUBLICATIONS

Office Action from related U.S. Appl. No. 12/625,144, mailed Mar. 7, 2011.

Randal E. Bryant; *Graph-Based Algorithms for Boolean Function Manipulation*; Aug. 1986; 28 pages; IEEE Transactions on Computers, C-35-8.

*An implicit formulation for exact BDD minimization*; Sep. 1996; 17 pages.

(Continued)

*Primary Examiner* — Cam-Y Truong
*Assistant Examiner* — Dung K Chau
(74) *Attorney, Agent, or Firm* — Alston & Bird LLP

(57) ABSTRACT

A system for identifying events includes a memory capable of storing a compressed event table including a number of events, the event table having been compressed by reducing the number of events in the event table without reducing the number of events represented by the event table. Each event of the event table includes a set of state parameters, and may also be associated with an output. The system also includes a processor capable of operating a fast state recognition (FSR) application. The FSR application, in turn, can receive a plurality of inputs, and identify an event of the compressed event table based upon the plurality of inputs and the state parameters of the compressed event table, event being identified in accordance with a state recognition technique.

18 Claims, 10 Drawing Sheets

OTHER PUBLICATIONS

Arlindo L. Oliveira, Luca P. Carloni, Tiziano Alberto L. Villa, Sangiovanni-Vincentelli; *Exact Minimization of Binary Decision Diagrams Using Implicit Techniques*; Nov. 1998; pp. 1282-1296; vol. 47, No. 11; IEEE Transactions on Computers.

Rajesh K. Gupta; *Logic-Leval Optimization*; 2002; 26 pages; ICS 252 (Springs 2002) Lecture 7.

Notice of Allowance from related U.S. Appl. No. 12/625,144, mailed Jun. 9, 2011.

* cited by examiner

| Rule # | Event | | | | | Course of Action | | | Fault Description | Maintenance Action |
|---|---|---|---|---|---|---|---|---|---|---|
| | A | B | C | D | E | X | Y | Z | | |
| 1 | 0 | 0 | 0 | 0 | 0 | 0 | 0 | 1 | A fault of type 1 has occurred | Remove and replace part number 123 |
| 2 | 0 | 0 | 0 | 0 | 1 | 1 | 1 | 1 | A fault of type 4 has occurred | Remove and replace part number 456 |
| 3 | 0 | 0 | 0 | 1 | 0 | 0 | 0 | 0 | No fault - normal system operating state | No action required |
| 4 | 0 | 0 | 0 | 1 | 1 | 0 | 0 | 0 | No fault - normal system operating state | No action required |
| 5 | 0 | 0 | 1 | 0 | 0 | 1 | 1 | 1 | A fault of type 4 has occurred | Remove and replace part number 456 |
| 6 | 0 | 0 | 1 | 0 | 1 | 1 | 1 | 1 | A fault of type 4 has occurred | Remove and replace part number 456 |
| 7 | 0 | 0 | 1 | 1 | 0 | 0 | 1 | 0 | A fault of type 2 has occurred | Inspect system XYZ |
| 8 | 0 | 0 | 1 | 1 | 1 | 0 | 0 | 1 | A fault of type 1 has occurred | Remove and replace part number 123 |
| 9 | 0 | 1 | 0 | 0 | 0 | 0 | 0 | 0 | No fault - normal system operating state | No action required |
| 10 | 0 | 1 | 0 | 0 | 1 | 1 | 1 | 1 | A fault of type 4 has occurred | Remove and replace part number 456 |
| 11 | 0 | 1 | 0 | 1 | 0 | 0 | 0 | 0 | No fault - normal system operating state | No action required |
| 12 | 0 | 1 | 0 | 1 | 1 | 1 | 1 | 1 | A fault of type 4 has occurred | Remove and replace part number 456 |
| 13 | 0 | 1 | 1 | 0 | 0 | 1 | 1 | 1 | A fault of type 4 has occurred | Remove and replace part number 456 |
| 14 | 0 | 1 | 1 | 0 | 1 | 0 | 0 | 0 | No fault - normal system operating state | No action required |
| 15 | 0 | 1 | 1 | 1 | 0 | 0 | 0 | 1 | A fault of type 1 has occurred | Remove and replace part number 123 |
| 16 | 0 | 1 | 1 | 1 | 1 | 0 | 0 | 0 | No fault - normal system operating state | No action required |
| 17 | 1 | 0 | 0 | 0 | 0 | 0 | 0 | 1 | A fault of type 1 has occurred | Remove and replace part number 123 |
| 18 | 1 | 0 | 0 | 0 | 1 | 1 | 1 | 1 | A fault of type 4 has occurred | Remove and replace part number 456 |
| 19 | 1 | 0 | 0 | 1 | 0 | 0 | 0 | 0 | No fault - normal system operating state | No action required |
| 20 | 1 | 0 | 0 | 1 | 1 | 1 | 1 | 1 | A fault of type 4 has occurred | Remove and replace part number 456 |
| 21 | 1 | 0 | 1 | 0 | 0 | 1 | 1 | 1 | A fault of type 4 has occurred | Remove and replace part number 456 |
| 22 | 1 | 0 | 1 | 0 | 1 | 1 | 1 | 1 | A fault of type 4 has occurred | Remove and replace part number 456 |
| 23 | 1 | 0 | 1 | 1 | 0 | 0 | 0 | 0 | No fault - normal system operating state | No action required |
| 24 | 1 | 0 | 1 | 1 | 1 | 0 | 1 | 0 | A fault of type 2 has occurred | Inspect system XYZ |
| 25 | 1 | 1 | 0 | 0 | 0 | 0 | 0 | 0 | No fault - normal system operating state | No action required |
| 26 | 1 | 1 | 0 | 0 | 1 | 0 | 0 | 1 | A fault of type 1 has occurred | Remove and replace part number 123 |
| 27 | 1 | 1 | 0 | 1 | 0 | 0 | 0 | 0 | No fault - normal system operating state | No action required |
| 28 | 1 | 1 | 0 | 1 | 1 | 0 | 1 | 1 | A fault of type 3 has occurred | Recalibrate part number 456 |
| 29 | 1 | 1 | 1 | 0 | 0 | 1 | 1 | 1 | A fault of type 4 has occurred | Remove and replace part number 456 |
| 30 | 1 | 1 | 1 | 0 | 1 | 0 | 0 | 0 | No fault - normal system operating state | No action required |
| 31 | 1 | 1 | 1 | 1 | 0 | 1 | 1 | 1 | A fault of type 4 has occurred | Remove and replace part number 456 |
| 32 | 1 | 1 | 1 | 1 | 1 | 0 | 0 | 1 | A fault of type 1 has occurred | Remove and replace part number 123 |

FIG. 6.

| | Event | | | | | Course of Action | | | | |
|---|---|---|---|---|---|---|---|---|---|---|
| Rule # | A | B | C | D | E | X | Y | Z | Fault Description | Maintenance Action |
| 1 | - | 0 | 0 | 0 | 0 | 0 | 0 | 1 | A fault of type 1 has occurred | Remove and replace part number 123 |
| 2 | 0 | 0 | - | 0 | 1 | 1 | 1 | 1 | A fault of type 4 has occurred | Remove and replace part number 456 |
| 3 | 0 | 0 | 0 | 1 | - | 0 | 0 | 0 | No fault - normal system operating state | No action required |
| 4 | 0 | - | 1 | 0 | 0 | 1 | 1 | 1 | A fault of type 4 has occurred | Remove and replace part number 456 |
| 5 | 0 | 0 | 1 | 1 | 0 | 0 | 1 | 0 | A fault of type 2 has occurred | Inspect system XYZ |
| 6 | 0 | 0 | 1 | 1 | 1 | 0 | 0 | 1 | A fault of type 1 has occurred | Remove and replace part number 123 |
| 7 | - | 1 | 0 | - | 0 | 0 | 0 | 0 | No fault - normal system operating state | No action required |
| 8 | 0 | 1 | 0 | - | 1 | 1 | 1 | 1 | A fault of type 4 has occurred | Remove and replace part number 456 |
| 9 | 0 | 1 | 1 | - | 1 | 0 | 0 | 0 | No fault - normal system operating state | No action required |
| 10 | 0 | 1 | 1 | 1 | 0 | 0 | 0 | 1 | A fault of type 1 has occurred | Remove and replace part number 123 |
| 11 | 1 | 0 | 0 | - | 1 | 1 | 1 | 1 | A fault of type 4 has occurred | Remove and replace part number 456 |
| 12 | 1 | 0 | - | 1 | 0 | 0 | 0 | 0 | No fault - normal system operating state | No action required |
| 13 | 1 | 0 | 1 | 0 | - | 1 | 1 | 1 | A fault of type 4 has occurred | Remove and replace part number 456 |
| 14 | 1 | 0 | 1 | 1 | 1 | 0 | 1 | 0 | A fault of type 2 has occurred | Inspect system XYZ |
| 15 | 1 | 1 | 0 | 0 | 1 | 0 | 0 | 1 | A fault of type 1 has occurred | Remove and replace part number 123 |
| 16 | 1 | 1 | 0 | 1 | 1 | 0 | 1 | 1 | A fault of type 3 has occurred | Recalibrate part number 456 |
| 17 | 1 | 1 | 1 | - | 0 | 1 | 1 | 1 | A fault of type 4 has occurred | Remove and replace part number 456 |
| 18 | 1 | 1 | 1 | 0 | 1 | 0 | 0 | 0 | No fault - normal system operating state | No action required |
| 19 | 1 | 1 | 1 | 1 | 1 | 0 | 0 | 1 | A fault of type 1 has occurred | Remove and replace part number 123 |

FIG. 7.

SYSTEM, METHOD AND COMPUTER PROGRAM PRODUCT FOR REAL-TIME EVENT IDENTIFICATION AND COURSE OF ACTION INTERPRETATION

CROSS-REFERENCE TO RELATED APPLICATIONS

This application is a continuation of U.S. application Ser. No. 10/994,773 filed Nov. 22, 2004 now U.S. Pat. No. 7,668, 632, which is hereby incorporated herein in its entirety by reference.

FIELD OF THE INVENTION

The present invention relates generally to systems and methods for identifying an event of a system based upon a plurality of state parameters and, more particularly, to systems and methods for providing real-time identification of a fault event in a vehicle and an associated course of action based upon a plurality of state parameters provided by the system.

BACKGROUND OF THE INVENTION

Modern day aircraft, and particularly modern day military aircraft, typically make use of a large number of actuators, sensors, modules and other components. These components produce, or can be monitored to obtain, signals indicative of their performance during takeoff, landing and other aircraft flight phases. Often one or more aircraft components are monitored and/or controlled by a module called a "line-replaceable-unit" (LRU). An LRU is a highly complex module often incorporating several processors for controlling and/or monitoring one or more components or subassemblies of an aircraft. An LRU may be provided to monitor and/or control one or more external devices such as an actuator, valve, motor, etc., associated with a particular component or assembly of the aircraft. An LRU typically also generates output signals which can be monitored to determine if the LRU and/or the component with which it is associated is not operating properly. Examples of some of the LRU's associated with a C-17 aircraft are listed as follows to provide an appreciation as to the wide ranging and diverse functions of a typical military aircraft which the LRU's are responsible for controlling:

| System/Component | Acronym |
|---|---|
| Emergency Egress Sequencer | ES |
| Aerial Delivery Locks Control Panel | ADLCP |
| Cargo Delivery System Control-Status Panel | CDSCSP |
| Aerial Delivery System Controller | ADSC |
| Aircraft Fault-Function Indicator Panel | AFFIP |
| Sensor Signal Interface | SSI |
| Antiskid-Brake Temperature Monitor Control Unit | ABTMCU |
| Electronic Engine Control | EEC |
| Electronic Engine Control (for Auxiliary EEC Power) | EEC |
| Auxiliary Power Unit Control Panel | APUCP |
| Environmental System-Fire Detection Control Panel | ESFDCP |
| Temperature Control Panel | TCP |
| Environmental Control System Controller | ECSC |
| Manifold Failure Detection Controller | MFDC |
| Cabin Pressure Controller | CPC |
| Cabin Air Pressure Selector Panel | CAPSP |
| Windshield Anti-icing Control Box | WAICB |
| Window Defogging Control Box | WDCB |

-continued

| System/Component | Acronym |
|---|---|
| Battery Charger | no acronym |
| Generator Control | GC |
| Electrical System Control Panel (Electrical Control Panel) | ECP |
| Static Frequency Converter (60 Hertz Converter) | no acronym |
| Static Power Inverter | no acronym |
| Bus Power Control Unit | BPCU |
| Hi-Intensity Wingtip Lights Power Supply | no acronym |
| Upper & Lower Beacon Light Power Supply | no acronym |
| Power Supply-Dimming Unit | no acronym |
| Battery Charger Set (Emergency Lighting Battery/Charger) | no acronym |
| Hydraulic System Controller | HSC |
| Hydraulic System Control Panel | HSCP |
| Fuel System-Engine Start Control Panel | FSESCP |
| Liquid Quantity Indicator | LQI |
| Ground Refueling Control Panel | GRCP |
| Fuel Quantity Computer | FQC |
| Fluid Purity Controller | FPC |
| Bearing-Distance-Heading Indicator | no acronym |
| Engine-Thrust Rating Panel Display | ETRPD |
| Signal Data Recorder | no acronym |
| (Quick Access Recorder) | (QAR) |
| Standard Flight Data Recorder | SFDR |
| Propulsion Data Management Computer | PDMC |
| (Aircraft Propulsion Data Management Computer) | (APDMC) (APM) |
| Flight Control Computer | FCC |
| Actuator Flight Control Panel | AFCP |
| Automatic Pilot Control-Indicator | APCI |
| Ground Proximity Warning Control Panel | GPWCP |
| Spoiler Control-Electronic Flap Computer | SCEFC |
| Display Unit | DU |
| (Multi Function Display) | (MFD) |
| Multifunction Control Panel | MCP |
| Air Data Computer | ADC |
| Inertial Reference Unit | IRU |
| Head-Up Display Unit ("Glass-cockpit" Display) | HUDU |
| Digital Computer | DC |
| (Mission Computer) | (MC) |
| Display Unit | (DU) |
| (Mission Computer Display) | (MCD) |
| Data Entry Keyboard | DEK |
| (Mission Computer Keyboard) | (MCK) |
| Intercommunications Set Control | ICSC |
| Intercommunications station | no acronym |
| Audio Frequency Amplifier | no acronym |
| Public Address Set Control | no acronym |
| Cordless Headset | no acronym |
| Radio Receiver-Transmitter | no acronym |
| Cargo Winch Remote Control | no acronym |
| Battery Charger | no acronym |
| Communication-Navigation Equipment Control | CNEC |
| Communications Equipment Control | CEC |
| Central Aural Warning Computer | CAWC |
| Warning And Caution Computer | WACC |
| Warning and Caution Annunciator Panel | WACAP |
| Signal Data Converter | SDC |
| Coder Decoder Keying Device | CDKD |
| Transponder Set Test Set | no acronym |
| (I-Band Transponder Test Set) | (TTU) |
| Satellite Data Unit | SDU |
| Communications Management Unit | CMU |
| Signal Acquisition Unit | SAU |

Aircraft such as the C-17 include a variety of actuators and sensors that provide output signals of flight conditions or vehicle health/state that can be monitored and recorded during operation. Many sensors and their outputs are not associated with an LRU, including electrical and electro-mechanical actuators, valves, transducers, sensors and the like.

Typically, in modern aircraft, the LRU's and other components are monitored to ensure proper operation of the aircraft. For example, onboard computing systems receive output data from a number of LRU's and other components over a Mil-Std-1553 data bus or Aeronautical Radio, Inc. (ARINC) standard 429 data bus. The output data can then be analyzed using Boolean logic diagrams, decision tables and other related methods. Evolving requirements for improved monitoring to reduce supportability costs and enhance safety, however, are putting new demands on current systems and methods of design. New functions are being specified that must smartly monitor subsystems and flight state, and make time-critical decisions. The size and complexity of these systems will continue to grow to achieve the cost and safety goals.

Traditional methods of monitoring and testing LRU's using production rules, logic diagrams, and decision tables work well for problems of limited size, but often have difficulty meeting requirements for complex systems including a large number of LRU's. In particular, the ability to completely verify and validate decision logic for large systems becomes a critical issue. Additionally, the types of decisions that future control systems must make will be based on expert safety strategies, as well as physical system parameters. Thus, future systems will most likely be required to rapidly recall previously captured knowledge depending upon existing conditions that are defined by large numbers of state parameters.

SUMMARY OF THE INVENTION

Embodiments of the present invention involves a software system that implements an improved method for identifying events based upon selected and monitored state parameters associated with the events and is especially suited for vehicle health monitoring of aircraft. Identifying events in real-time, the system selects an associated course of action. By monitoring the state parameters and quickly interpreting them in a networked analysis to identify system events, association can be drawn between combinations of the state parameters to make control decisions. In the context of aircraft or other mobile contexts, for example, embodiments of the present invention are further capable of interpreting the state parameters in a manner that reduces the need to transmit large quantities of system parametric data for off-board system health management applications. Also in such contexts, embodiments of the present invention are capable of being utilized by off-board system health management applications to rapidly process very large sets of state parameter data that have been transmitted for off-board processing, such as is typical for those which have limited on-board processing resources and/or for those which desire extended data storage.

In accordance with one aspect of the present invention, a system is provided for identifying events. The system includes a memory capable of storing a compressed event table including a number of events, the event table having been compressed by reducing the number of events in the event table without reducing the number of events represented by the event table. In this regard, the event table can have been compressed by reducing the number of events with respect to events associated with the same output. Irrespective of how the event table is compressed, however, each event of the event table comprises a set of state parameters, and may also be associated with an output. The system also includes a processor capable of operating a fast state recognition (FSR) application. The FSR application, in turn, is capable of receiving a plurality of inputs, and identifying an event of the compressed event table based upon the plurality of inputs and the state parameters of the compressed event table, with the event being identified in accordance with a state recognition technique, such as a masked neural network technique or a binary decision diagram technique.

More particularly, the FSR application may be capable of identifying an event by matching the plurality of inputs with a set of state parameters of the compressed event table. In addition, the FSR application can be capable of determining an output based upon the identified event.

In one advantageous context, the memory is capable of storing an event table including a number of events of a vehicle, where each event of the event table comprises a set of state parameters representing known outputs of a plurality of modules of the vehicle. In such a context, the FSR application is capable of receiving a plurality of inputs comprising data output by the modules of the vehicle, or more particularly, data output onto a plurality of buses from the modules of the vehicle during operation of the vehicle. Also, each event of the event table may further be associated with a course of action. Thus, in addition to identifying an event, the FSR application may be capable of determining a course of action based upon the identified event.

Further, the memory and processor may be embodied in a monitoring controller associated with the vehicle. Thus, after the FSR application identifies an event, the monitoring controller can be capable of packaging event data including the identified event for at least one module, and possibly the determined course of action. For example, the monitoring controller may be capable of packaging event data by compressing event data and/or removing at least one extraneous data field of the event data based upon a format of the event data. The monitoring controller may further be capable of recording the output data after receiving the output data. Then, the FSR application may be capable of transmitting the packaged event data external to the vehicle at least partially over a wireless communication link; the monitoring controller transmitting the packaged event data via a data unit of the vehicle.

The system can include a plurality of monitoring controllers, each associated with a vehicle, such as an aircraft in a fleet of aircraft, and including a memory and a processor. In such instances, the system can also include a user processor capable of receiving the output data and/or the event data from each of the plurality of monitoring controllers. Also, the user processor can be capable of sending, to at least one monitoring controller, at least one of the output data and the event data from at least one other monitoring controller.

According to other aspects of the present invention, a method and computer program product are provided for identifying events.

BRIEF DESCRIPTION OF THE DRAWINGS

Figure 1:
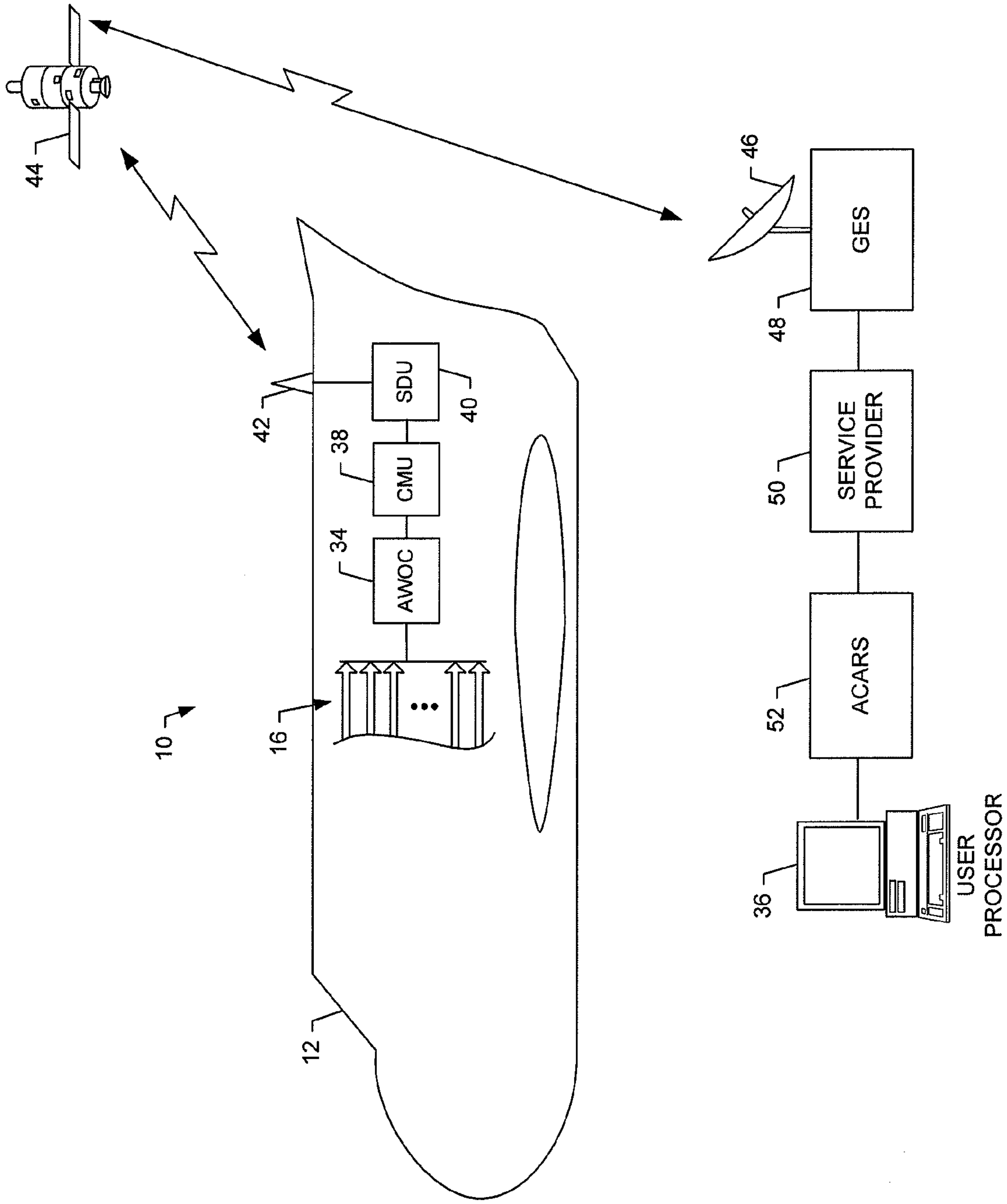
Figure 2:
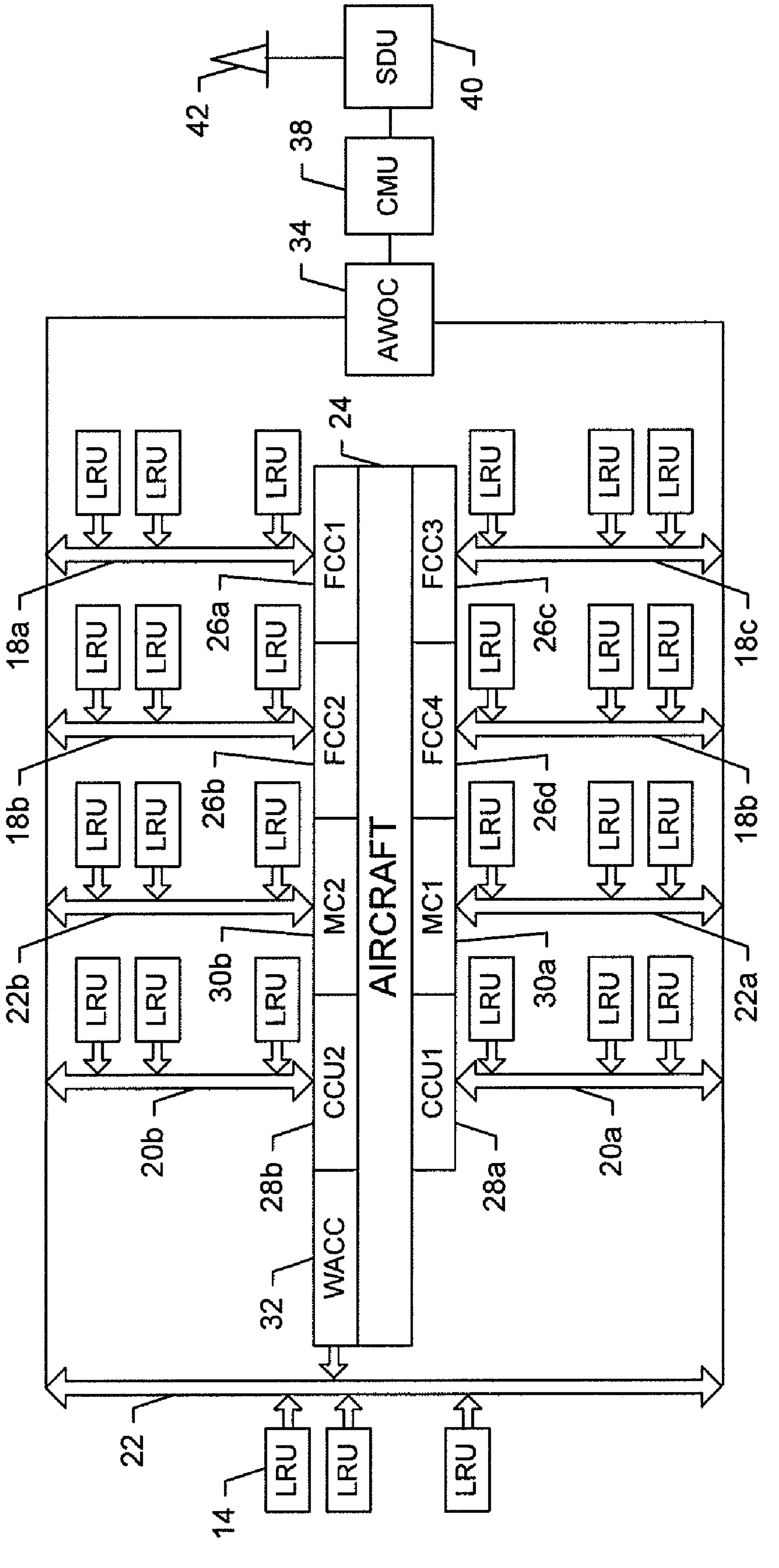
Figure 3:
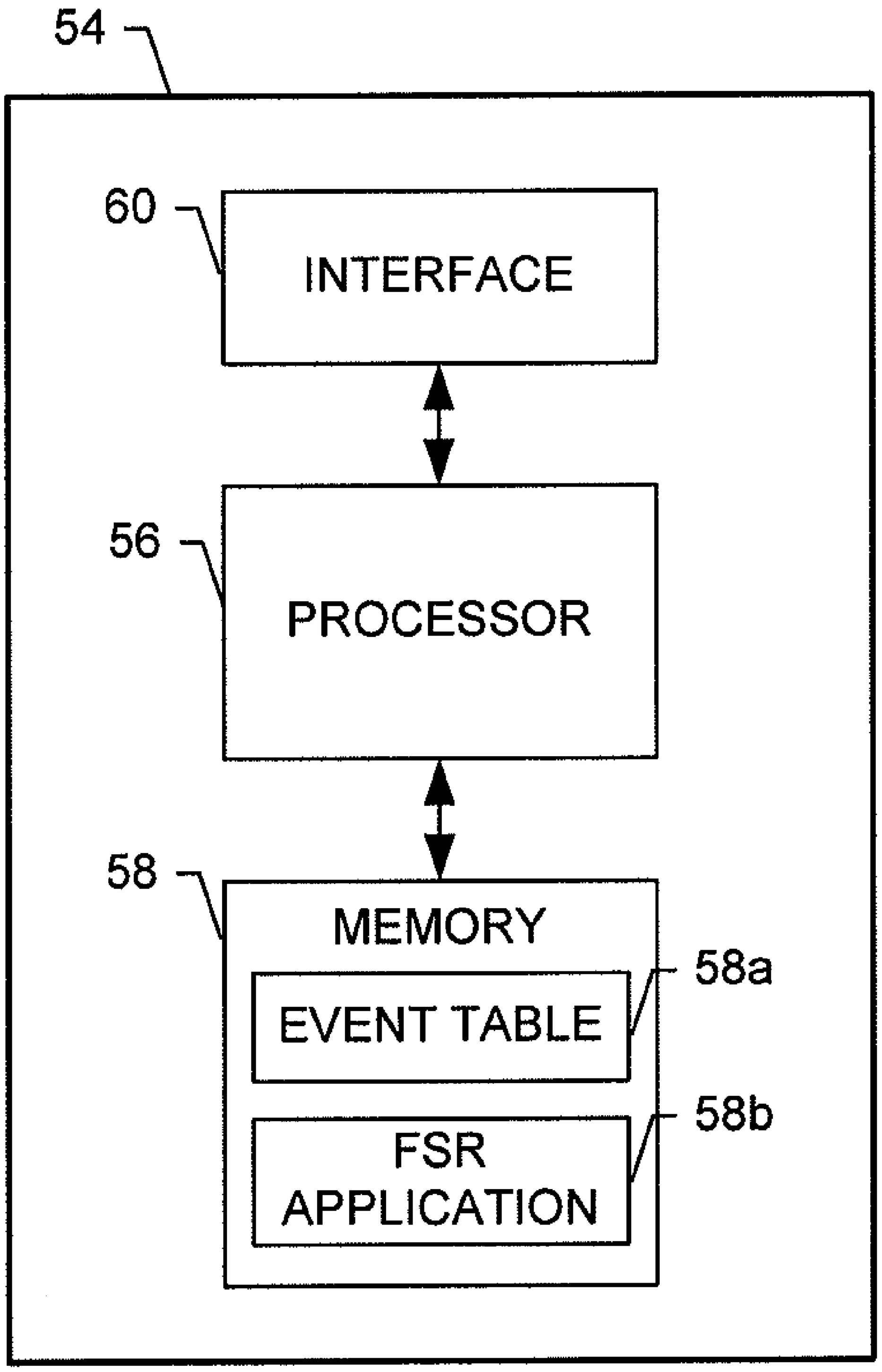
Figure 4:
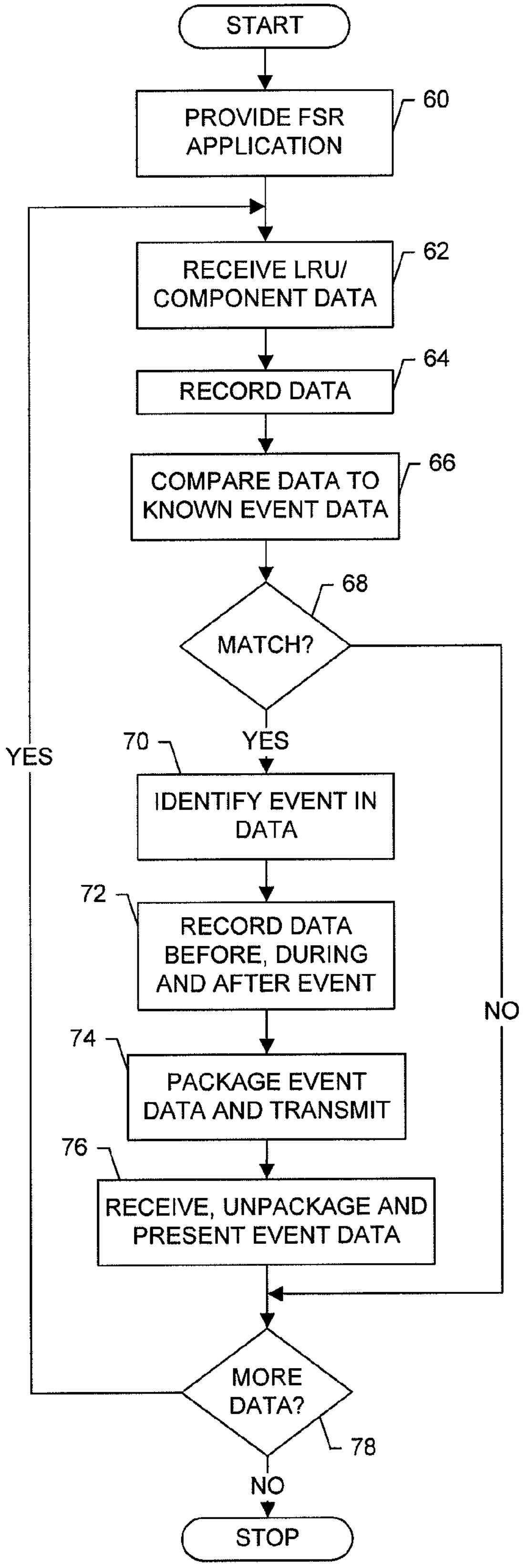
Figure 5:
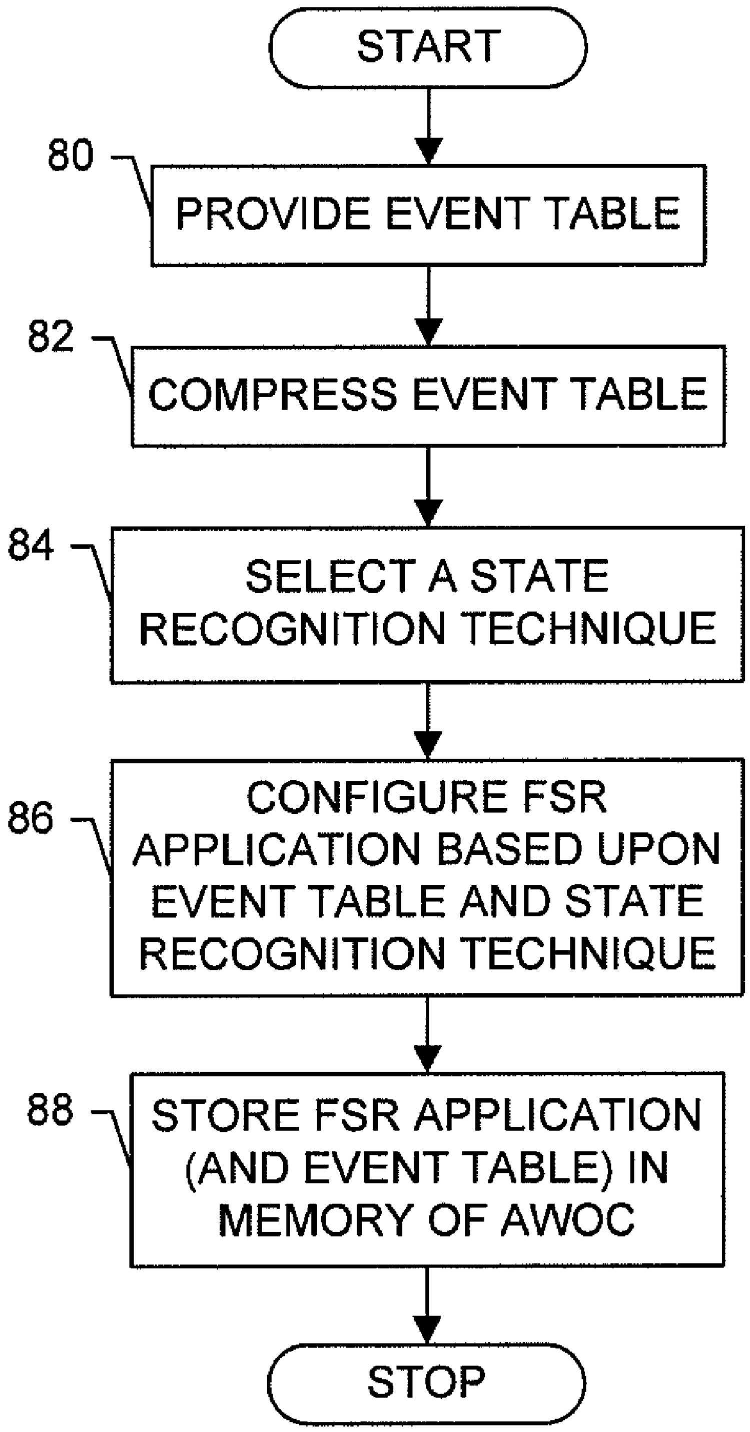
Figure 8:
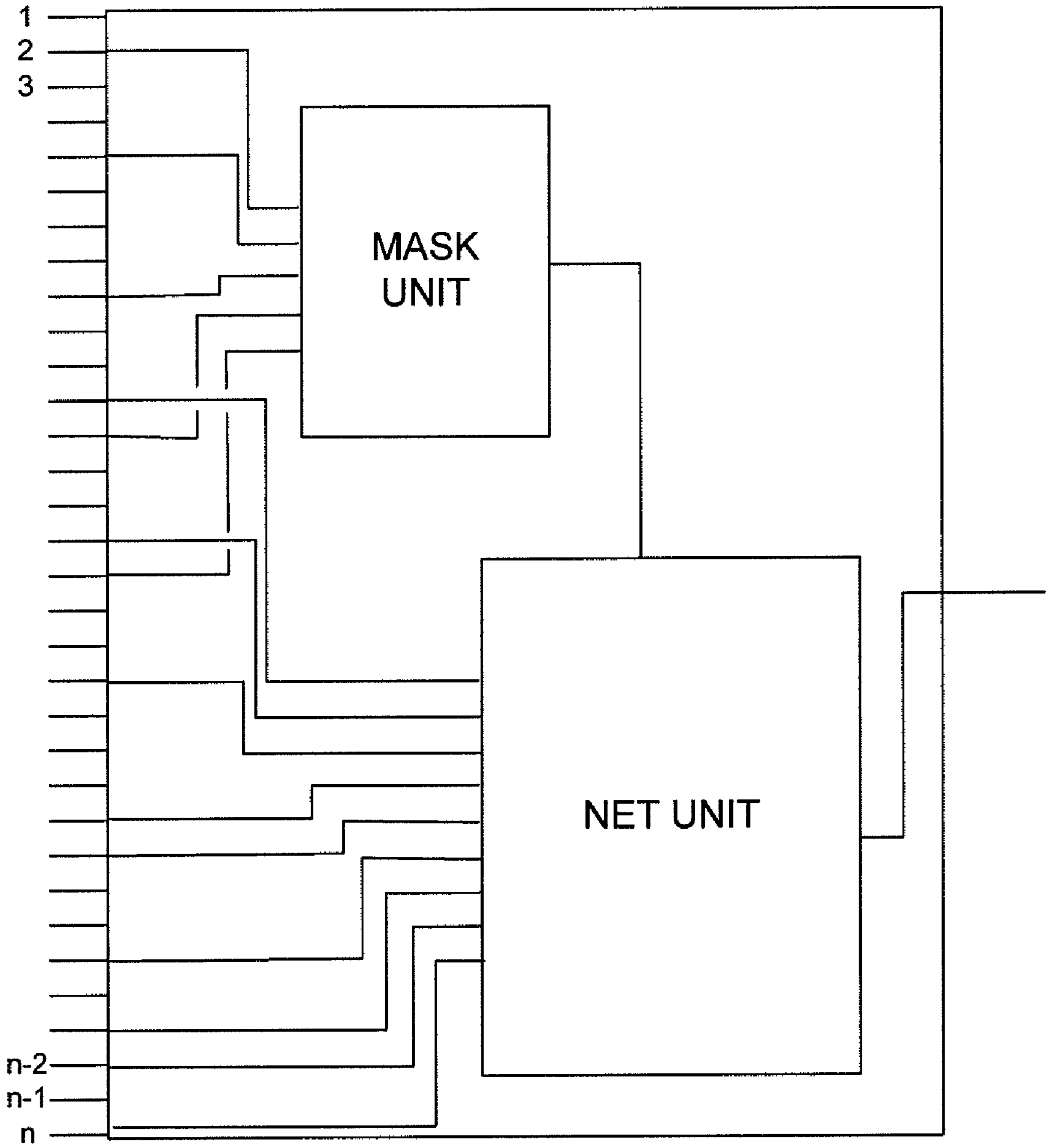
Figure 9:
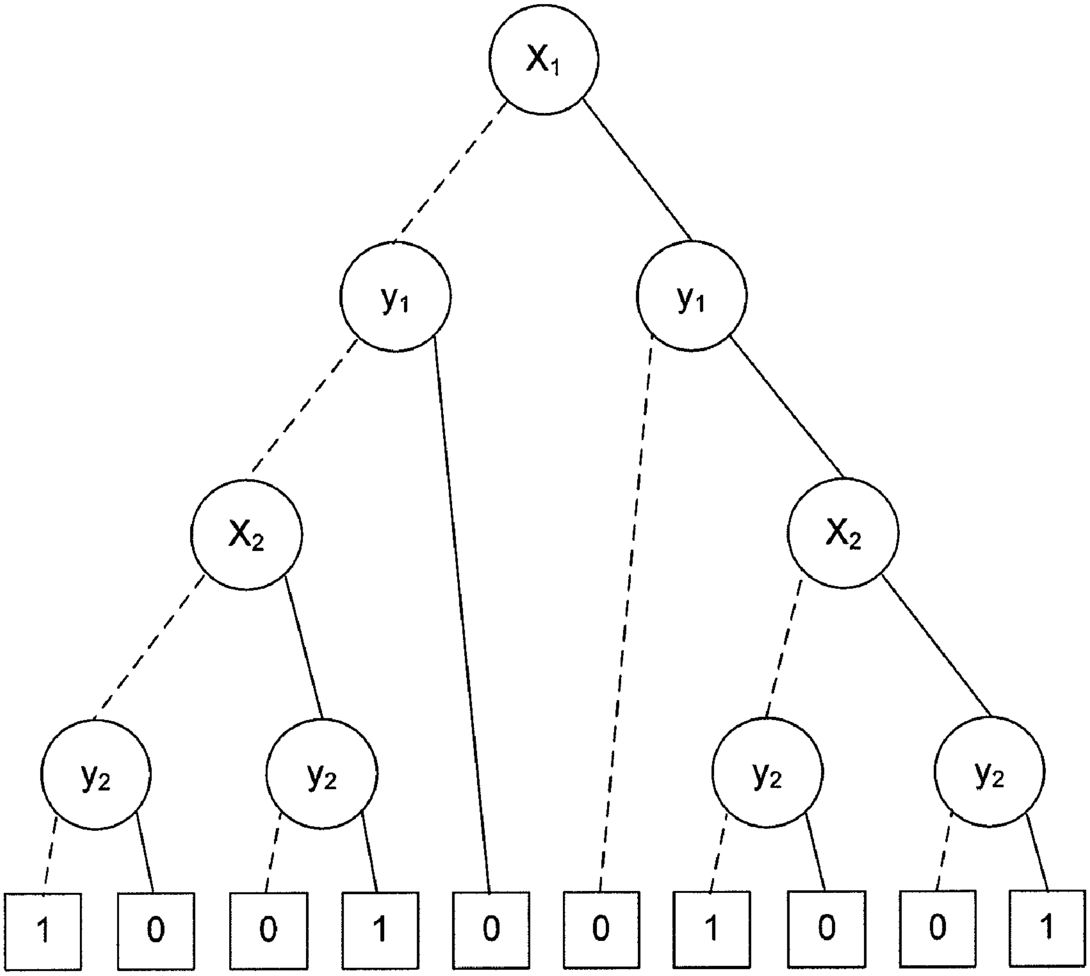
Figure 10:
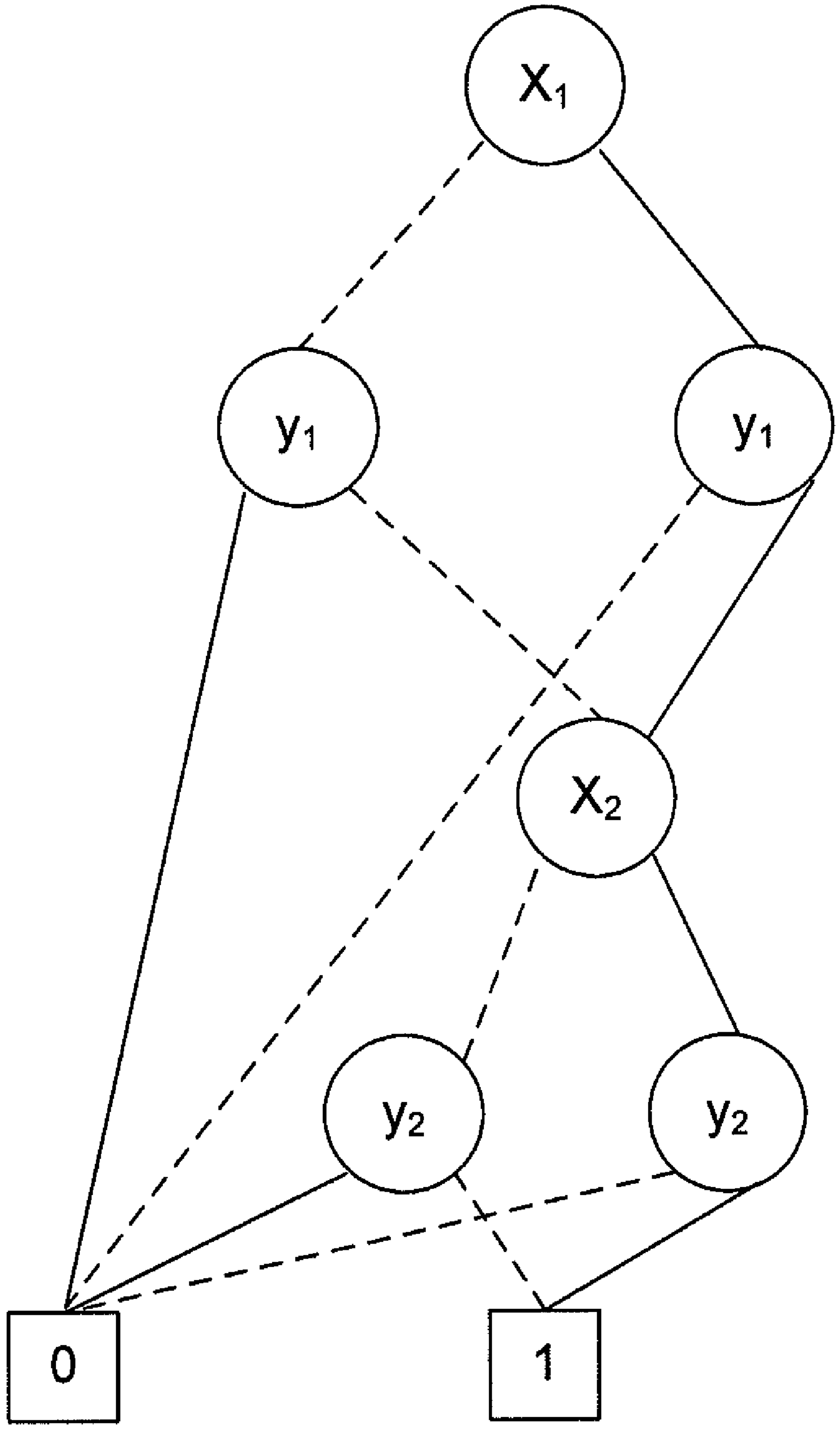

Having thus described the invention in general terms, reference will now be made to the accompanying drawings, which are not necessarily drawn to scale, and wherein:

FIG. 1 is a schematic block diagram of a system for real-time event identification and course of action interpretation in accordance with one embodiment of the present invention;

FIG. 2 is a schematic block diagram more particularly illustrating the system of FIG. 1;

FIG. 3 is a schematic block diagram of an entity capable of operating as a monitoring controller in accordance with one embodiment of the present invention;

FIG. 4 is a flowchart including various steps in a method of identifying events, in accordance with one embodiment of the present invention;

FIG. 5 illustrates various steps in a method of providing a fast state recognition (FSR) application to identify events;

FIG. 6 illustrates an exemplar event table in accordance with one embodiment of the present invention;

FIG. 7 illustrates the event table of FIG. 6, the event table of FIG. 7 having been compressed in accordance with one embodiment of the present invention;

FIG. 8 illustrates a functional block diagram of a mask and net unit arrangement for operation of the FSR application in accordance with a masked neural network technique, in accordance with one embodiment of the present invention;

FIG. 9 illustrates a typical binary decision (BDD) tree for $(x_1 \Leftrightarrow y_1) \Lambda (x_2 \Leftrightarrow y_2)$ in accordance with one embodiment of the present invention; and FIG. 10 illustrates the BDD tree of FIG. 9, the BDD tree of FIG. 10 having been reduced in accordance with one embodiment of the present invention.

DETAILED DESCRIPTION OF THE INVENTION

The present invention now will be described more fully with reference to the accompanying drawings, in which preferred embodiments of the invention are shown. This invention may, however, be embodied in many different forms and should not be construed as limited to the embodiments explicitly disclosed. FIG. 1 illustrates an embodiment of the present invention for recording faults (i.e., system state) of a vehicle, system, device or the like whose operation is being monitored with a plurality of distributed sensors. The system can be used in a variety of applications to identify the occurrence of an event from a large number of input state parameters. The system 10 records faults, in this case, of a C-17 aircraft 12, but could be adapted to for other aircraft (e.g., 767T, 737 NG, Multi-Mission Maritime (MMA) aircraft, etc.), other vehicles (e.g., spacecraft, rockets, ships, land vehicles, amphibious vehicles, etc.), buildings, factories or the like. The aircraft 12 includes line-replaceable-units (LRU's) 14 (FIG. 2) communicating sensed data about the state of the LRU over appropriate avionics buses 16. An LRU might contain several processors for controlling and/or monitoring one component, a network of components, or a subassembly on the aircraft, and, generally, is associated with at least one external device such as an actuator, valve, motor or the like.

The aircraft 12 can include any of a number of different LRU's 14, such as those identified above in the background section, capable of communicating across one or more avionics buses 16. Each avionics bus, and thus the respective LRU's, can be configured to communicate in accordance with any of a number of different standards or protocols. In one typical embodiment, for example, a plurality of avionics buses can be configured in accordance with Mil-Std-1553, entitled: *Military Standard Aircraft Internal Time Division Command/Response Multiplex Data Bus* (with which its revisions and updates are incorporated by reference for all purposes). In such instances, as shown more particularly in FIG. 2, aircraft such as the C-17 aircraft can include four flight control buses 18*a*-18*d*, two communication buses 20*a*, 20*b*, two mission buses 22*a*, 22*b* and a warning and caution system (WACS) bus 24.

Each Mil-Std-1553 bus 18*a*-18*d*, 20*a*, 20*b*, 22*a*, 22*b*, 24 of the aircraft 12, in turn, can include a primary and a secondary channel for transmitting signals between the various LRU's 14 and bus controller of the respective bus. In this regard, each of the LRU's associated with each Mil-Std-1553 bus is considered a bus controller or remote terminal and a single avionics bus configured in accordance with Mil-Std-1553 may support up to thirty-one separate remote terminals. For example, as shown in FIG. 2, each flight control bus 18*a*-18*d* can have an associated flight control computer (FCC) 26*a*-26*d* and a number of LRU's. Each FCC, then, can control the LRU's associated with a respective flight control bus to thereby control the primary and secondary flight surfaces of the aircraft.

Also, for example, each communication bus 20*a*, 20*b* can have an associated communication control unit (CCU) 28*a*, 28*b* and a number of LRU's. The CCU's can control the LRU's associated with the respective buses to control functions for the Integrated Radio Management System (IRMS), including radio, intercom and public address (PA) system control. Each mission bus 22*a*, 22*b*, for example, can have an associated mission computer (MC) 30*a*, 30*b*, often referred to as a core integrated processor (CIP). The MC's can control operation of a number of LRU's associated with the respective mission buses to provide control, display and data processing for navigation system modes and sensor management navigation capability. The MC's can also provide four-dimensional (4D) guidance of the aircraft, thrust management and data for aircraft takeoff, landing, missed approach and engine-out conditions. Further, for example, the WACS bus 24 can include a warning and caution computer WACC 32 controlling operation of a number of LRU's associated with the WACS bus. In addition, the WACC can convert aircraft status/failure signals for display on a warning annunciator panel (WAP).

As explained more fully below, to monitor the avionics buses 16 of the aircraft 12, the system of one embodiment of the present invention includes a monitoring controller 34, referred to as an advanced wireless open data controller (AWOC), coupled to one or more of the avionics buses 16. The AWOC is capable of receiving data output from one or more of the LRU's associated with one or more avionics buses, and thereafter recording and/or transmitting at least a portion of the data to a user processor 36 for subsequent presentation, analysis or the like. In contrast to conventional techniques for testing LRU's of an aircraft 12, the AWOC is capable of monitoring the data output from all of the LRU's associated with a greater plurality of avionics buses, such as all of the LRU's associated with the Mil-Std-1553 buses 18*a*-18*d*, 20*a*, 20*b*, 22*a*, 22*b*, 24. Also in contrast to conventional techniques, the AWOC can be configured to identify events (e.g., faults) in the data output by the respective LRU's in accordance with a state recognition technique based upon a compressed number of events of the aircraft. By being capable of identifying the events, the AWOC can identify a course of action to perform in response to identifying those events. The AWOC can also identify events in a manner requiring less memory and/or computing resources than conventional techniques. In addition, the AWOC can be capable of selectively recording and transmitting data output from the LRU's, or filter out data output from the LRU's that does not indicate an event of one or more LRU's. As such, the AWOC can further transmit recorded data without requiring an undesirable amount of time.

The AWOC 34 can transmit the data to the user processor 36 in any of a number of different manners, but typically over a wireless communications link. In one typical embodiment, for example, the AWOC transmits the data to the user processor in accordance with a satellite communication technique. In this regard, the AWOC can communicate with a communications management unit (CMU) 38, also included within the aircraft 12. As will be appreciated by those skilled in the art, the CMU is capable of providing a communications link between the aircraft and external systems, while prioritizing such communications from different sources within the aircraft. In accordance with embodiments of the present invention, then, the CMU is also capable of receiving data from the AWOC. For example, the AWOC can communicate with the CMU over an ARINC 429 communications bus in accordance with the Williamsburg Bit Order Protocol (BOP). In turn, the CMU is capable of passing the data to a data unit, such as a satellite data unit (SDU) 40, which is coupled to an antenna 42, both of which are well known to those skilled in the art.

The SDU 40 can access an Aircraft Communication Addressing and Recording System (ACARS) system to facilitate transfer of the data to the user processor 36. As will be appreciated by those skilled in the art, ACARS is commonly used for two-way digital communications between an aircraft and a ground earth station (GES) via an ARINC communications network. More particularly, then, the SDU can transmit the data to a satellite 44 via the antenna 42. The satellite, in turn, passes the data to a satellite receiver 46 or dish coupled to a GES 48. From the GES, the data can pass through a service provider 50, such as an ARINC or Service Information and Technology Architecture (SITA) provider. For example, the data can pass through a network provided by the mobile satellite communications network operator Inmarsat of London, England. Once the service provider receives the data, the service provider can forward the data to the user processor, such as via an ACARS server 52. Once the user processor receives the data, the user processor can utilize the data for a number of different purposes, such as for presentation, analysis or the like.

Referring now to FIG. 3, a block diagram of an entity capable of operating as an AWOC 34 is shown in accordance with one embodiment of the present invention. As shown, the AWOC can generally include a number of components housed within an enclosure 54 such as, for example, any of a number of enclosures manufactured by Miltron Systems Inc. of North Easton, Mass. The AWOC can include any of a number of different components, including one or more processors 56 connected to memory 58. The processor(s) can comprise any of a number of known processors such as, for example, model VMPC6D single board computer(s) (SBC) manufactured by Thales Computers of Raleigh, N.C. Likewise, the memory can comprise any of a number of known memories including, for example, a 6U model VME25 SCSI flash disk manufactured by Targa Systems Division, L-3 Communications of Canada Inc. of Ottawa, Ontario.

The memory 58 of the AWOC 34 can comprise volatile and/or non-volatile memory, and typically stores content, data or the like. For example, the memory typically stores software applications, instructions or the like for the processor(s) to perform steps associated with operation of the AWOC in accordance with embodiments of the present invention. For example, the memory can store an operating system, such as the VxWorks® operating system, distributed by Wind River of Alameda, Calif. As explained below, the memory typically stores at least a portion of data output by one or more of the LRU's as the AWOC monitors such LRU's. In addition, the memory can be used to store a database or event table 58*a* including data representative of known events (e.g., fault events) of the aircraft 12, where one or more events can have an associated course of action to perform upon identifying the event. As such, the AWOC can additionally or alternatively store, into the memory, select event data based upon whether the output data indicates an event in the aircraft 12. In this regard, the memory can further store a fast state recognition (FSR) application 58*b* capable of identifying events (e.g., fault events), and/or associated courses of action, in accordance with a FSR technique based upon at least a portion of the data output by one or more of the LRU's, and the event table. As described, the FSR application typically comprises software capable of being stored within the memory and operated by the AWOC. However, that the FSR application can alternatively comprise firmware or hardware, without departing from the spirit and scope of the present invention.

In addition to the memory 58, the processor(s) 56 of the AWOC 24 can also be connected to at least one interface 60 or other means for transmitting and/or receiving data, content or the like between the AWOC and the avionics buses 16 of the aircraft 12. In one embodiment, for example, the processor(s) is connected to one or more Mil-Std-1553 bus interfaces, one or more of which can comprise a model QPMC-1553 Mil-Std-1553 PMC (PCI Mezzanine Card) interface manufactured by Condor Engineering of Santa Barbara, Calif. The processor(s) can be additionally, or alternatively, connected to one or more ARINC 429 bus interfaces, one or more of which can comprise a model CEI-820 PMC interface manufactured by Condor Engineering. The interface(s) can be directly connected to the processor(s). As will be appreciated, however, one or more of the interface(s) can alternatively be indirectly connected to the processor(s), such as via one or more Versa Module Europa (VME) PMC carriers, which can comprise VME PMC carrier's manufactured by Thales Computers.

Reference is now made to FIG. 4, which illustrates various steps in a method of identifying events, in accordance with one embodiment of the present invention. Generally, as shown in block 60, the method includes generating, receiving or otherwise providing a FSR application 58*b* configured in accordance with an event table 58*a* including data representative of known events (e.g., fault events) of the aircraft 12. As shown in FIG. 5, for example, generating, receiving or otherwise providing the FSR application includes generating, receiving or otherwise providing an event table 58*a* including a set of a plurality of state parameters of the aircraft, as shown in block 80. Each state parameter represents a known state of one or more LRU's of the aircraft. For example, the state parameters can include landing gear down, actuator failed, overspeed, TCAS (traffic alert and collision avoidance system) active, low altitude alert, stall and the like. The state parameters are capable of taking on a binary value of 1 or 0 representing a true or false condition, respectively, of the respective parameters during operation of the aircraft. Alternatively, one or more state parameters can take on the value "don't care" whereby the value of the respective state parameters can be represented by the Boolean expression 1 OR 0.

As will be appreciated, then, combinations of the values of the state parameters can represent different states of the aircraft 12, where the event table 58*a* includes states that correspond to events of the aircraft. Likewise, the events of the aircraft can be associated with courses of action that include combinations of one or more action parameters, each of which can represent an action to perform with respect to the system in response to the event of the aircraft being identified. For example, in the context of aircraft, action parameters can include display emergency check list, warn pilot, automatic fly-up and the like. Like the state parameters, the action parameters are capable of taking on a binary value of 1 or 0 representing a true or false condition, respectively, of respective actions to perform. Also like the state parameters, one or more action parameters can take on the value "don't care," representative of the Boolean expression 1 OR 0.

As shown in the exemplar event table below, the event table can comprise a truth table including combinations of the state parameters showing the relationship between the values the state parameters take, and the associated action parameters and the relationship between the values the action parameters take. More particularly, the event table 58*a* can include a plurality of "rules," where each rule identifies or is otherwise associated with a unique event of the aircraft 12, as well as a respective course of action. In this regard, the event table can include a number of rules equal to $2^n$, where n represents the number of state parameters. For the Navy's Active Network Guidance in Emergency Logic (ANGEL) system including 39 state parameters, then, the event table can include $2^{39}$ rules (approximately $5.498\times10^{11}$ rules). The C-17 Aerial Delivery System (ADS), on the other hand, includes 55 state parameters and can have an event table with $2^{55}$ rules (approximately $3.603\times10^{16}$ rules).

Exemplar Event Table

| Rule | Event (State Parameters 4, 3, 2, 1) | Course of Action (Action Parameters 3, 2, 1) |
|---|---|---|
| 1 | 0, 0, 0, 1 | 0, 0, 1 |
| 2 | 0, 0, 0, 1 | 0, 1, 0 |
| 3 | 0, 0, 1, 0 | 0, 1, 1 |
| 4 | 0, 0, 1, 1 | 0, 0, 1 |
| 5 | 0, 1, 0, 0 | 1, 0, 0 |

Reference is now briefly made to FIG. 6, which illustrates another exemplar event table 58*a*, in accordance with one embodiment of the present invention. As shown, the aircraft 12 includes 5 state parameters (i.e., state parameters A, B, C, D and E) for a total of 32 (i.e., $2^5$) rules. The event table also includes courses of action defined by three action parameters. In addition, although not necessary, the event table includes a textual description of the aircraft event and/or the course of action. More particularly with reference to the event table of FIG. 2, the aircraft events relate to faults in the system, and as such, the textual descriptions refer to fault descriptions. Also, for example, the courses of action relate to maintenance actions to perform in the instances of the respective faults.

After generating or otherwise receiving the event table 58*a*, the event table can be compressed or otherwise optimized with respect to the number of events included therein, as shown in block 82 of FIG. 5. As will be appreciated, in various instances a course of action can be associated with more than one event. For example, in the above shown event table, course of action (0, 0, 1) is associated with events (0, 0, 0, 1) and (0, 0, 1, 1). In such instances, the events associated with the same course of action can include one or more state parameters that vary from one event to the other. Continuing the above example, then, state parameter 2 has a value of 0 in one of the events associated with course of action (0, 0, 1), and a value of 1 in the other event. As can be seen, then, course of action (0, 0, 1) is associated with events whereby the state parameters 4, 3 and 1 have the values 0, 0 and 1, respectively, regardless of the values of state parameter 2. State parameter 2, then, can take on the value of "don't care" with respect to course of action (0, 0, 1).

The event table 58*a* can therefore be compressed or otherwise optimized by reducing multiple events associated with the same course of action, where one or more of the state parameters of the reduced number of events are replaced by "don't care" values, or another value representing the Boolean 0 OR 1. Thus, as will be appreciated, the number of events in the event table can be reduced without reducing the number of events represented by the event table. As will also be appreciated, the amount of compression or optimization achieved by the event table can vary based upon the state parameters and associated courses of action. It can be shown, then, that the event table for the ANGEL system (39 state parameters) can be compressed from approximately $5.498\times10^{11}$ rules to 8,485 rules ($8.485\times10^3$ rules), a compression of approximately eight orders of magnitude. The event table for the C-17 ADS (55 state parameters), on the other hand, can be compressed even further, from approximately $3.603\times10^{16}$ rules to 389 rules ($3.890\times10^2$ rules), a compression of approximately fourteen orders of magnitude.

Furthering the above example, then, the exemplar event table 58*a* can be compressed into the following:

Compressed Exemplar Event Table

| Rule | Event (State Parameters 4, 3, 2, 1) | Course of Action (Action Parameters 3, 2, 1) |
|---|---|---|
| 1 | 0, 0, —, 1 | 0, 0, 1 |
| 2 | 0, 0, 0, 1 | 0, 1, 0 |
| 3 | 0, 0, 1, 0 | 0, 1, 1 |
| 4 | 0, 1, 0, 0 | 1, 0, 0 |

In the compressed event table above, the dash (i.e., "-") represents a "don't care" value for the respective state parameter(s). In this regard, as shown, rule 1 is associated with course of action (0, 0, 1) and event (0, 0, -, 1). Event (0, 0, -, 1), then, can be considered the functional equivalent of events (0, 0, 0, 1) or (0, 0, 1, 1). Referring briefly to FIG. 7, the event table of FIG. 6 is shown after being compressed in accordance with one embodiment of the present invention. As shown, the 32 rule event table of FIG. 2 can be compressed to a 19 rule event table by replacing the state parameter(s) of the appropriate events with "don't care" values.

Before or after compressing or otherwise optimizing the event table 58*a*, a state recognition technique can be selected or otherwise identified, as shown in block 84 of FIG. 5. As will be appreciated, the state recognition technique can be selected from a set of one or more state recognition techniques. For example, the state recognition technique can be selected from a set of techniques including a lookup table technique, a neural network technique, a pseudo neural network or masked neural network technique, and/or a binary decision diagram (BDD) technique, each of which are explained in greater detail below.

After compressing or otherwise optimizing the event table 58*a*, and after selecting or otherwise identifying a state recognition technique, the FSR application 58*b* can be trained or otherwise configured to identify events (e.g., fault events) of the aircraft 12 based upon data output by the LRU's 14 of the aircraft. More particularly, the FSR application can be trained or otherwise configured to identify events in accordance with the selected state recognition technique based upon the compressed event table, as shown in block 86 of FIG. 5. As will be appreciated, the FSR application can be trained or otherwise configured in any of a number of different manners, typically based upon the selected state recognition technique.

In accordance with a lookup table technique, for example, the FSR application can be configured to identify an event in the event table by sequentially searching the rules of the event table for an event including state parameters that match the data output by the LRU's 14 of the aircraft 12. In accordance with a neural network technique, the FSR application 58*b* may compute "weights" directly from data output by the LRU's, from which the FSR application can identify an event. Such a neural network technique has a structure similar to that of a conventional RAM-based neural network. But because perfect representation, as opposed to generalization, is typically required, the structure of such a neural network technique typically still includes a separate output neuron for each event in the event table.

In accordance with a masked neural network technique, the FSR application 58*b* provides each event of the compressed event table with a functional mask unit and/or a functional net unit for processing the state parameters of the respective event, the units for one event being shown in FIG. 8. More particularly with respect to each event, the FSR application maps all state parameters that are always binary 0 or 1 to a mask unit. All state parameters that always have a don't-care value for an event are not mapped to either the mask unit or a net unit. And all other state parameters are mapped to neurons in the net unit.

The mask unit is configured to basically perform a Boolean AND operation with every state parameter that is mapped to it. Those state parameters that are always a binary 1 for the event are mapped directly to the AND gate. And those state parameters that are always a binary 0 for the event are passed through a NOT gate before being mapped to the AND gate. It is worth noting that the nature of the mask unit is that if any of the state parameters to the AND are a binary 0, the whole mask unit automatically fails to output a binary 1. This, in turn, is used as an early stop for events that have not only a mask unit, but a respective net unit as well. In this regard, the output of the mask unit acts as an on/off switch for the net unit.

The net unit provided by the masked neural network technique is similar to the neural network technique, though implementation of the net unit is slightly different in that the net unit, as with the mask unit, includes a map of state parameters to it for each neuron. In this regard, as with the entire classification structure, state parameters that are inconsequential to a neuron are not mapped to that neuron. Therefore, once a masked network is built, there are no longer "don't care" values present, but merely 0s, 1s, and state parameter maps.

Each neuron in the net unit holds a vector of binary "weights" against which the mapped state parameters are compared, similar to the mask unit. The neuron outputs a binary 1 if all of the mapped inputs match what is found in its weight vector. Otherwise, the neuron outputs a binary 0. Because the net unit is built directly from the data, which includes every possible state, it is not possible for more than one neuron to fire for any particular set of input data during operation of the masked neural network technique. To identify an event in accordance with the masked neural network technique, then, the FSR application can be configured to perform sequentially process data based upon each mask/net unit arrangement until the mask/unit arrangement of an event produces an output, that event being the identified event.

More particularly with respect to the BDD technique, BDD's are rooted, directed acyclic graphs with a number of nodes, of which there are two types, as is well known to those skilled in the art. Internal (branch) nodes have an out-degree of two, and are associated with an input variable. The node's outgoing branches represent the then-branch and else-branch of an "if-then-else" (ITE) switch that is dependent on that variable. Terminal (leaf) nodes each have an out-degree of zero, and are labeled with a 0 or 1. To illustrate these features, FIG. 9 illustrates a typical binary decision tree for $(x_1 \Leftrightarrow y_1) \Lambda (x_2 \Leftrightarrow y_2)$ where the dashed lines denote low-branches, and the solid lines denote high-branches. From the illustrated tree, then, it can be shown that every node represents a Boolean expression:

$$t=x_1 \rightarrow t_1,t_0$$

$$t_0=y_1 \rightarrow 0,t_{00}$$

$$t_1=y_1 \rightarrow t_{00},0$$

$$t_{00}=x_2 \rightarrow t_{001},t_{000}$$

$$t_{11}=x_2 \rightarrow t_{111},t_{110}$$

$$t_{000}=y_2 \rightarrow 0,1$$

$$t_{001}=y_2 \rightarrow 1,0$$

$$t_{110}=y_2 \rightarrow 0,1$$

$$t_{111}=y_2 \rightarrow 1,0$$

From the Boolean expressions, as well as visual inspection of the tree, it can also be seen that some of the nodes are redundant. Thus, by identifying and removing the redundant nodes and redirecting the edges, the number of Boolean expressions, and thus the size of the tree, can be reduced to the following:

$$t=x_1 \rightarrow t_1,t_0$$

$$t_0=y_1 0,t_{00}$$

$$t_1=y_1 \rightarrow t_{00},0$$

$$t_{00}=x_2 \rightarrow t_{001},t_{000}$$

$$t_{000}=y_2 \rightarrow 0,1$$

$$t_{001}=y_2 \rightarrow 1,0$$

In accordance with the BDD technique, then, the FSR application 58*b* can generate or otherwise receive a binary decision tree for the compressed event table 58*a*, where the terminal nodes are labeled with a course of action (i.e., sequence of action parameters). For a single bit output, all terminal nodes can be consolidated into at most two nodes, representing the binary values 0 and 1, to thereby reduce the size of the tree. For a multi-bit course of action, then, the size of the tree can be reduced by consolidating all terminal nodes into a number of unique terminal nodes, each representing a unique course of action. The resulting, consolidated structure is now a BDD. In this regard, FIG. 10 illustrates a BDD tree having been reduced from that shown in FIG. 9, the BDD being for $(x_1 \Leftrightarrow y_1) \Lambda (x_2 \Leftrightarrow y_2)$. As shown, all of the paths going through the BDD from the root node to a terminal node in FIG. 10 follow the same variable ordering, that is $x_1 > y_1 > x_2 > y_2$. This is known as an ordered BDD (OBDD).

It is worth noting that more than one BDD may represent the same function. Due to a slight difference in variable ordering, however, BDD's representing the same function may greatly differ in size. Thus, it will be appreciated that the variable ordering of a BDD can greatly affect the size of the BDD. It has been shown that finding the exact minimal BDD by finding the corresponding optimal variable ordering is NP-complete (non-deterministic polynomial-time complete). In accordance with embodiments of the present invention, the layers of the BDD can be ordered in any of a number of different, known manners. In one typical embodiment, for example, the layers of the BDD are ordered in accordance with a simulated annealing technique or a genetic technique. For more information on such simulated annealing and genetic technique, see B. Bollig et al., *Simulated Annealing to Improve Variable Orderings for OBDD's* and R. Drechsler et al., *A Genetic Algorithm for Variable Ordering of OBDD's*, respectively, both presented at the International Workshop on Logic Synthesis, Granlibakken, Calif. (May 1995), and both incorporated by reference.

After training or otherwise configuring the FSR application 58*b* to identify events (e.g., fault events) of the aircraft 12 the FSR application can be auto-coded or otherwise adapted to receive data, and identify an event based upon the received data and in accordance with the compressed event table and selected state recognition technique. Thereafter, the FSR application, and the event table if desired or otherwise necessary for operation of the FSR application, can be stored in memory 58 of the AWOC 34 for subsequent operation by the AWOC onboard the aircraft, as shown in block 88.

Again referring to FIG. 4, after generating, receiving or otherwise providing the FSR application 58*b*, the method includes the AWOC 34 receiving data output by the LRU's 14 of the aircraft over the avionics buses 16, as shown in block 62. In one typical embodiment, for example, the AWOC can receive data output by the LRU's associated with both channels of all nine Mil-Std-1553 buses (i.e., flight control buses 18*a*-18*d*, communication buses 20*a*, 20*b*, mission buses 22*a*, 22*b* and WACS bus 24) of a C-17 aircraft. The data can include any of a number of different pieces of data output by the respective LRU's, but in one typical embodiment, the data comprises data output by the respective LRU's during operation of the aircraft. For example, the data of one typical embodiment can comprise the data as the respective LRU's output during any of a number of different typical flights of the aircraft.

As the AWOC 34 receives the data output by the LRU's 14 onto the avionics buses 16, the AWOC can record the data into memory 58, as shown in block 64. The AWOC can record the data as the AWOC receives the data from the respective buses. In one typical embodiment, however, the AWOC performs a lossless compression technique before recording such data. In such instances, for example, the AWOC can record only changes in data output by respective LRU's, recording only data header information for the same data output by respective LRU's from one instant to the next instant.

Also as the AWOC 34 receives the data, the AWOC can operate the FSR application 58*a*, which can function to compare the data output by the LRU's to the data in the compressed event table 58*a* in accordance with the selected state recognition technique, the data being representative of events of the LRU's, as shown in block 66. In this regard, the FSR application can function to compare the data output by the LRU's to the data in the compressed event table to detect a match between the data output by one or more of the LRU's and one or more events in the compressed event table, thereby identifying the respective events of the aircraft 12. If the FSR application does not detect a match, the AWOC and FSR application can continue to receive, record and compare data output by the LRU's, as illustrated in blocks 68 and 78. If the FSR application detects a match, however, the AWOC can identify an event and/or course of action associated with an event, as shown in block 70. In such instances, the AWOC can separately record event data for the respective event(s). The event data for each event can comprise any of a number of different pieces of information including, for example, the data output by the respective LRU's during the event, the course of action associated with the events, and/or textual descriptions of the event and/or the course of action. And in one typical embodiment, the event data further includes data output by the respective LRU's for a given time period (e.g., one second) before and after the event.

After recording the event data, the AWOC 34 can package the event data, such as to reduce the size of the event data, as shown in block 74. In addition, the AWOC can package one or more additional pieces of data with the event data, if so desired. For example, the AWOC can package an identifier (e.g., tail number) and/or location (e.g., latitude, longitude, altitude, etc.) of the aircraft, and/or date and/or time information, along with the event data. The AWOC can package the event data and any other data in accordance with any of a number of known techniques. In one typical embodiment, for example, the AWOC packages the event data by compressing the event data in accordance with the GZIP compression technique, as such is well known to those skilled in the art. In addition, before compressing the data, the AWOC can further package the data by removing any extraneous data fields from the data structure of the event data. For example, the AWOC can remove data fields such as unused data words and additional message identifiers.

After packaging the event data, the AWOC 34 can transmit the data to a user processor 36, as shown in FIG. 1 and block 74 of FIG. 4. The AWOC can transmit the data in any of a number of different manners. In one typical embodiment, as explained above, the AWOC transmits the data in accordance with a satellite communication technique via the CMU 38, SDU 40 and antenna 42 of the aircraft 12. Although not shown, upon receipt of the data at the user processor, the packaged event data can be unpackaged, such as by reinserting the extraneous data fields from the data structure of the event data and uncompressing the event data. Thereafter, the event data can be presented to skilled personnel, such as for analysis, as shown in block 76. In one typical embodiment, the event data is advantageously capable of being received and/or presented by the user processor during the flight of the aircraft during which the AWOC identified the respective event. As such, event(s) of the LRU's 14 of the aircraft are capable of being received and/or presented in at least a partial real-time manner by the user processor.

As an example of a typical scenario that would benefit from the system and method of embodiments of the present invention, consider that during a flight of the aircraft 12, a first radar altimeter (RAD) associated with the first mission bus 22*a* experiences a fault. During normal operation, as will be appreciated, the RAD communicates with the first MC 30*a* over the first mission bus to provide altitude information regarding the aircraft. Thus, in instances in which the RAD experiences a fault, data output by the RAD to the MC can indicate such a fault. After the RAD outputs data onto the first mission bus for the first MC, the AWOC 34 can receive the data from the mission bus and record the data, along with the data output from the other LRU's 14 of the aircraft (see block 64 of FIG. 4). In addition, the FSR application 58*b* can compare the data to the compressed event table 58*a* stored in memory 58 to identify the fault in the RAD, and thereafter package the event data and transmit the packaged event data to the user processor 36.

In various instances data output from the LRU's 14 of the aircraft other than the event data may be desired for presentation and/or analysis. In such instances, one or more pieces of the data recorded by the AWOC 34 (see block 64 of FIG. 4) can be received by the user processor 36 in addition to the event data for presentation and/or analysis. For example, during a flight of the aircraft 12, one or more pieces of the data output by the LRU's can be continuously transmitted to the user processor, such as in the same manner as the event data. Additionally or alternatively, for example, following a flight of the aircraft, piece(s) of the data output by the LRU's can be transferred (e.g., downloaded) from the memory 58 of the AWOC to the user processor, such as in accordance with any of a number of different data transfer techniques. Thus, by receiving piece(s) of data output by the LRU's other than the event data, the user processor can, if so desired, replay at least a portion of a flight of the aircraft, including the state of the respective LRU's during the flight.

As will also be appreciated, the event data can be analyzed in any of a number of different manners. In one embodiment, in addition to presenting the event data for display by the user processor 36, the user processor can also include a ground-based reasoner, such as a software, hardware or firmware ground-based reasoner. The ground-based reasoner can comprise a knowledge-based system that reads data (LRU data and/or event data) recorded by the AWOC 34. In turn, the ground-based reasoner can isolate faults in one or more of the LRU's 14 by data mining the data output by the LRU's and recorded by the AWOC into memory 58. For example, upon recognition of a disagree fault in a slat sensor of the aircraft 12, the ground-based reasoner can check the data output from all of the aircraft slat sensors at the time the AWOC identified a fault in a slat sensor to determine the specific slat sensor that caused the fault.

It should further be appreciated that the system of embodiments of the present invention can be employed in a plurality of vehicles, such as a fleet of aircraft 12. In such instances, the AWOC's 34 of the aircraft can form a network with a centralized user processor 36 such that the AWOC's can operate or otherwise function in a network-centric manner. The user processor, then, can receive data output by the LRU's 14 of the fleet of aircraft and/or event data for the respective LRU's of the fleet. By receiving the data output by, and/or the event data of, the LRU's of each aircraft of a fleet of aircraft, the user processor can individually monitor the LRU's of the respective aircraft, and/or collectively monitor one or more of the LRU's of the fleet. Further, the user processor can communicate with the AWOC's of each of the aircraft of the fleet, such as across the same channel as the AWOC's communicate with the user processor, to send data to the aircraft. More particularly, for example, the user processor can communicate the data output by, and/or the event data of, the LRU's of one or more of the aircraft to the AWOC's of one or more other aircraft. Thus, for example, the user processor can facilitate aircraft coordinating operation with each other based upon the data output by, and/or the event data of, the LRU's of the respective aircraft.

Although the aircraft 12 is shown and described as including a number of Mil-Std-1553 buses, the aircraft can, and typically does, include one or more avionics buses configured to communicate in accordance with other protocols or standards. For example, the aircraft can include one or more avionics buses 16, and thus LRU's 14, configured to communicate in accordance with ARINC 429, 629 or the like. Also, for example, the aircraft can include one or more buses configured to communicate in accordance with IEEE 1451, the IntelliBus™ protocol developed by The Boeing Company, or the like. Thus, as described, the system and method of embodiments of the present invention are capable of recording events from data output on one or more of the Mil-Std-1553 buses. However, that the system and method of embodiments of the present invention can be equally applicable to any of a number of other buses or communication links between components of an aircraft.

As explained above, the AWOC 34, or more particularly the FSR application **58*b* operated by the AWOC, is capable of identifying events (e.g., faults) of the aircraft 12 or in data output by the LRU's 14 of the aircraft. However, that the FSR application, as well as the event table 58*a* may alternatively be stored or otherwise maintained by the user processor 36**. In such instances, the AWOC can record the data output by the LRU's, and if so desired, compress the data in accordance with a lossless compression technique before recording the data. The AWOC can also package the data output by the LRU's, or the compressed data output by the LRU's, such as in the same manner as the aforementioned event data. The packaged output data can then be transmitted to the user processor, which can then operate the FSR application to identify event(s) based upon the data, such as in the same manner as before.

As also described above, the data output by the LRU's comprises binary data having true (i.e., 1) or false (i.e., 0) states. It should also be understood that the data output by one or more LRU's may alternatively comprise data having more than two states, such as in accordance with a higher-order numbering scheme. In such instances, the event table **58*a*, and thus operation of the FSR application 58*b*** can be adapted to operate based upon the greater number of possible states of the output of the respective LRU's.

As further explained above, the event table **58*a* includes or otherwise identifies events of an aircraft 12, where the events are associated with courses of action to perform upon identifying the respective events. Moreover, the FSR application 58*b* is capable of identifying events and/or associated courses of action based upon data output by the LRU's 14** of the aircraft. Generally, then, the event table includes a plurality of events, each event comprising a set of state parameters. Also in the event table, each event may be associated with an output (e.g., course of action), where the output can comprise a plurality of output (e.g., action) parameters.

Generally, the event table can be compressed by reducing the number of events with respect to those events associated with the same output. The FSR application of embodiments of the present invention is adapted to receive a plurality of inputs (e.g., data output by the LRU's of the aircraft). Applying a state recognition technique, the FSR application identifies an event, and/or determines an output, based upon the inputs and a compressed event table. More particularly, the FSR application can identify the event by matching the inputs with a set of state parameters.

According to one aspect of the present invention, the system 10 of the present invention generally operates under control of a computer program product (e.g., FSR application **58*b***). The computer program product for performing the methods of embodiments of the present invention includes a computer-readable storage medium, such as the non-volatile storage medium, and computer-readable program code portions, such as a series of computer instructions, embodied in the computer-readable storage medium. The computer-readable program code portions may include separate executable portions for performing distinct functions to accomplish methods of embodiments of the present invention. Additionally, or alternatively, one or more of the computer-readable program portions may include one or more executable portions for performing more than one function to thereby accomplish methods of embodiments of the present invention.

In this regard, FIGS. 4 and 5 are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed, they are used in a generic and descriptive sense only and not for purposes of limitation.

What is claimed is:

1. A system for identifying events, the system comprising:

a memory configured to store a compressed event table including a second number of distinct events and, for each event, a set of state parameters, the compressed event table having been generated from an uncompressed event table including a first, greater number of distinct events than the compressed event table, the uncompressed event table also including, for each event of the uncompressed event table, a unique set of state parameters, the same first number of distinct events being identifiable from both the compressed and uncompressed event tables;

a processor configured to operate a fast state recognition (FSR) application, wherein the FSR application is configured to receive a plurality of inputs, and at least a portion of the compressed event table or a representation thereof, and in response to receiving the plurality of inputs, identify an event from the compressed event table based upon a comparison between the plurality of inputs and the state parameters of the events of the compressed event table, event being identified in accordance with a state recognition technique; and an advanced wireless open controller (AWOC), coupled to one or more avionics buses, configured to identify events in output data and configured for selectively recording and transmitting output data and filter out data that does not indicate an event of one or more line-replaceable units (LRU's) to reduce the memory and computing resources.

2. The system according to claim 1, wherein the memory is configured to store a compressed event table including a number of events each further associated with an output, the compressed event table having been generated by reducing the number of events with respect to events associated with the same output.

3. The system according to claim 1, wherein the FSR application is further configured to determine an output based upon the identified event.

4. The system according to claim 1, wherein the FSR application is configured to identify an event in accordance with a masked neural network technique.

5. The system according to claim 1, wherein the FSR application is configured to identify an event in accordance with a binary decision diagram technique.

6. The system according to claim 1, wherein the FSR application being configured to identify an event includes being configured to match the plurality of inputs with a set of state parameters of the compressed event table.

7. A computer-implemented method of identifying events, the method comprising:

providing, from a memory, a compressed event table including a second number of distinct events and, for each event, a set of state parameters, the compressed event table having been generated from an uncompressed event table including a first, greater number of distinct events than the compressed event table, the uncompressed event table also including, for each event of the uncompressed event table, a unique set of state parameters, the same first number of distinct events being identifiable from both the compressed and uncompressed event tables;

receiving a plurality of inputs, and at least a portion of the compressed event table or a representation thereof; and in response to receiving the plurality of inputs, identifying an event from the compressed event table based upon a comparison between the plurality of inputs and the state parameters of the events of the compressed event table, event being identified in accordance with a state recognition technique, the event being identified by a processor configured to identify an event from the compressed event table; and coupling to one or more avionics buses an advanced wireless open controller (AWOC) configured to identify events in the data output and configured for selectively recording and transmitting output data and filter out data that does not indicate an event of one or more line-replaceable units (LRU's) to reduce the memory and computing resources.

8. The method according to claim 7, wherein each event of the uncompressed event table is associated with an output, the compressed event table having been generated from the uncompressed event table by reducing the number of events with respect to events associated with the same output.

9. The method according to claim 7 further comprising determining an output based upon the identified event.

10. The method according to claim 7, wherein identifying an event in accordance with a fast state recognition technique comprises identifying an event in accordance with a masked neural network technique.

11. The method according to claim 7, wherein identifying an event in accordance with a fast state recognition technique comprises identifying an event in accordance with a binary decision diagram technique.

12. The method according to claim 7, wherein identifying an event comprises matching the plurality of inputs with a set of state parameters of the compressed event table.

13. A computer program product for identifying events, wherein the computer program product comprises at least one non-transitory computer-readable storage medium having computer-readable program code portions stored therein, the computer-readable program code portions comprising:

a first executable portion configured to provide a compressed event table including a second number of distinct events and, for each event, a set of state parameters, the compressed event table having been generated from an uncompressed event table including a first, greater number of distinct events than the compressed event table, the uncompressed event table also including, for each event of the uncompressed event table, a unique set of state parameters, the same first number of distinct events being identifiable from both the compressed and uncompressed event tables;

a second executable portion configured to receive a plurality of inputs, and at least a portion of the compressed event table or a representation thereof;

a third executable portion configured to identify an event from the compressed event table based upon a comparison between the plurality of inputs and the state parameters of the events of the compressed event table, event being identified in accordance with a state recognition technique, the third executable portion being configured to identify the event in response to the second executable portion receiving the plurality of inputs; and an advanced wireless open controller (AWOC) coupled to one or more avionics buses configured to identify events in the data output and configured for selectively recording and transmitting output data and filter out data that does not indicate an event of one or more line-replaceable units (LRU's) to reduce the memory and computing resources.

14. The computer program product according to claim 13, wherein each event of the uncompressed event table is associated with an output, the compressed event table having been generated from the uncompressed event table by reducing the number of events with respect to events associated with the same output.

15. The computer program product according to claim 13 further comprising a fourth executable portion configured to determine an output based upon the identified event.

16. The computer program product according to claim 13, wherein the third executable portion is configured to identify an event in accordance with a masked neural network technique.

17. The computer program product according to claim 13, wherein the third executable portion is configured to identify an event in accordance with a binary decision diagram technique.

18. The computer program product according to claim 13, wherein the third executable portion being configured to identify an event includes being configured to match the plurality of inputs with a set of state parameters of the compressed event table.

* * * * *